United States Patent [19]

Sakakida et al.

[11] Patent Number: 5,211,694
[45] Date of Patent: May 18, 1993

[54] SAFETY APPARATUS INCLUDING AN AIR BAG AND A SAFETY BELT SUPPORTED ON A VEHICLE WITH A DEFORMABLE COUPLING

[75] Inventors: Masafumi Sakakida; Yasunori Iwamoto; Toshiyuki Manabe, all of Hiroshima, Japan

[73] Assignee: Mazda Motor Corporation, Hiroshima, Japan

[21] Appl. No.: 887,377

[22] Filed: May 21, 1992

Related U.S. Application Data

[63] Continuation of Ser. No. 536,885, Jun. 13, 1990, abandoned.

[30] Foreign Application Priority Data

Jun. 20, 1989 [JP] Japan .................................. 1-157006

[51] Int. Cl.⁵ .......................................... B60R 22/36
[52] U.S. Cl. ..................................... 280/806; 280/807; 188/374; 188/376
[58] Field of Search ............... 280/805, 806, 807, 801, 280/808; 188/371-374, 376; 297/472, 471, 475

[56] References Cited

U.S. PATENT DOCUMENTS

| 3,106,989 | 10/1963 | Fuchs | 297/472 |
| 3,198,288 | 8/1965 | Presunka | 297/472 |
| 3,938,627 | 2/1976 | Nagazumi | 280/805 |
| 4,027,905 | 6/1977 | Shimogawa | 280/805 |
| 4,129,321 | 12/1978 | Garvey | 297/472 |
| 4,381,086 | 4/1983 | Pfeiffer | 280/805 |
| 4,948,199 | 8/1990 | Weller | 297/483 |
| 4,949,995 | 8/1990 | Haland | 280/805 |

FOREIGN PATENT DOCUMENTS 3830493 4/1989 Fed. Rep. of Germany ...... 280/805
62-139740 6/1987 Japan .

Primary Examiner—Karin L. Tyson
Attorney, Agent, or Firm—Keck, Mahin & Cate

[57] ABSTRACT

A safety apparatus is installed in a vehicle provided with an air bag system having an air bag which is housed, when empty, in a container in front of a driver's seat. The air bag is inflated to protect the driver during a collision. The safety apparatus is provided with an impact diminishing mechanism for preventing a shoulder belt from being increasingly tensioned by the body of the driver any time before the inflated air bag acts on the driver with a maximum impact.

23 Claims, 10 Drawing Sheets

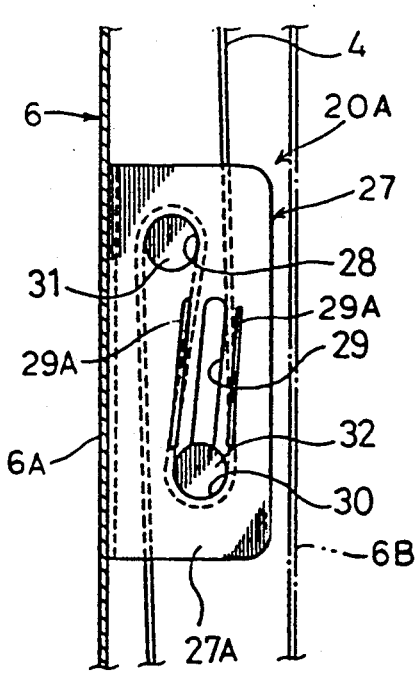
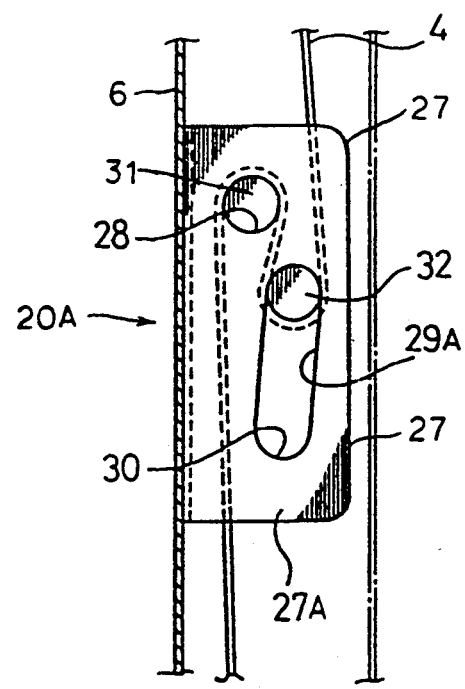
FIG. 4A
FIG. 4B
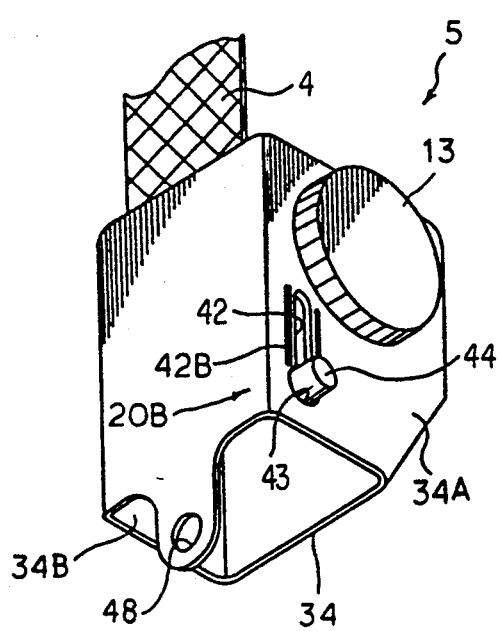
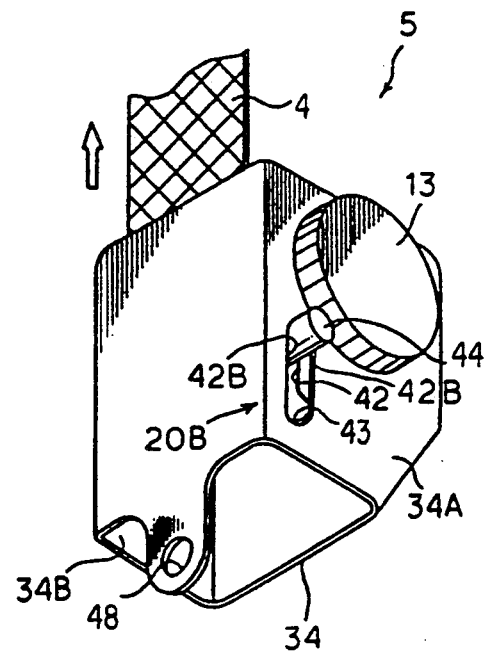
FIG. 5A
FIG. 5B

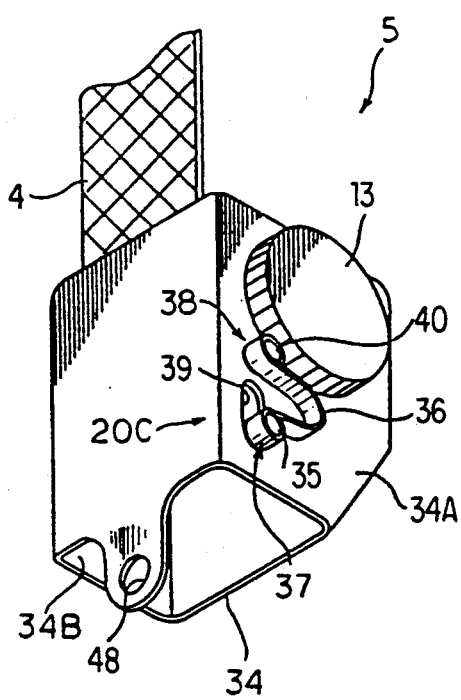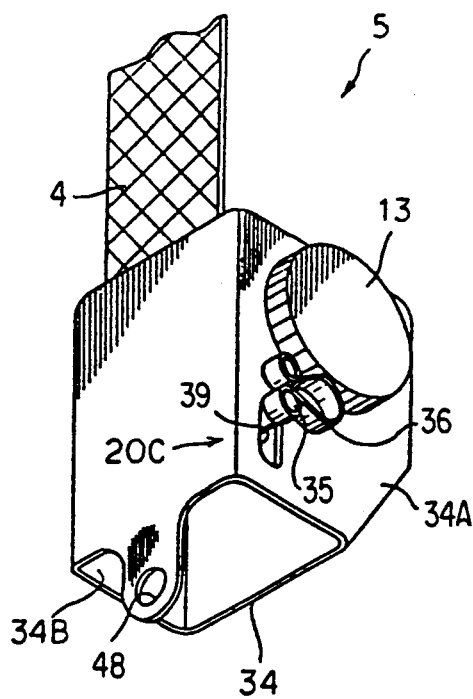
FIG.6A  FIG.6B
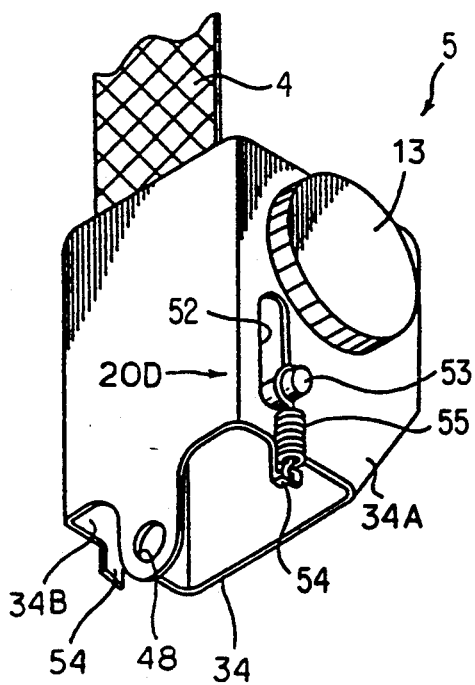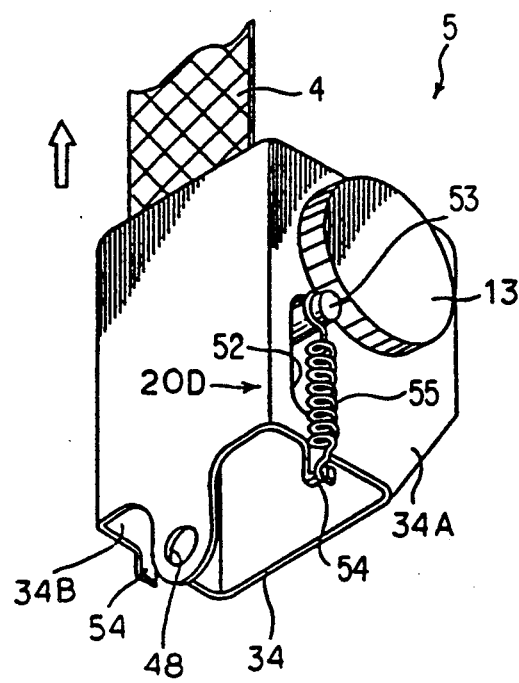
FIG.7A  FIG.7B

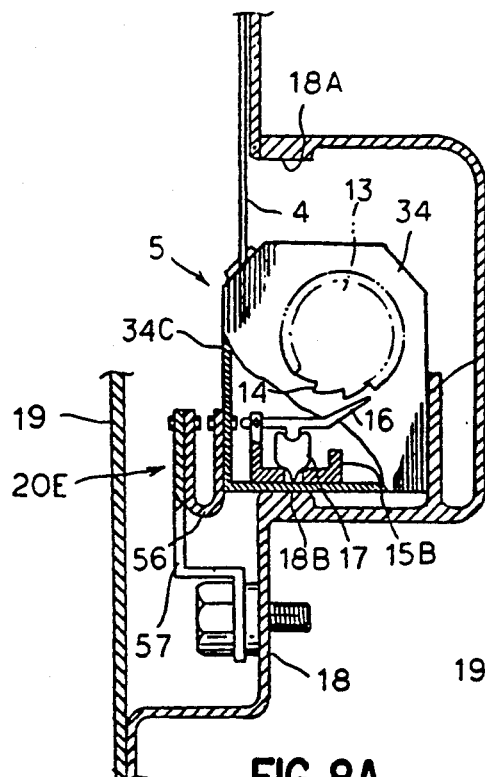
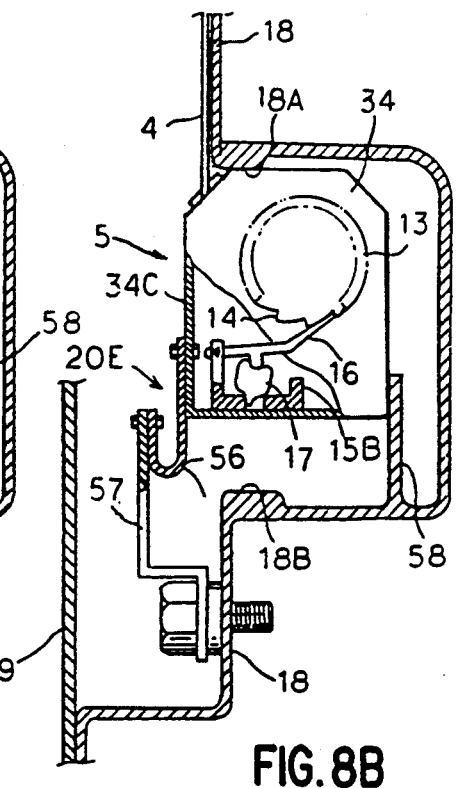
FIG. 8A  FIG. 8B
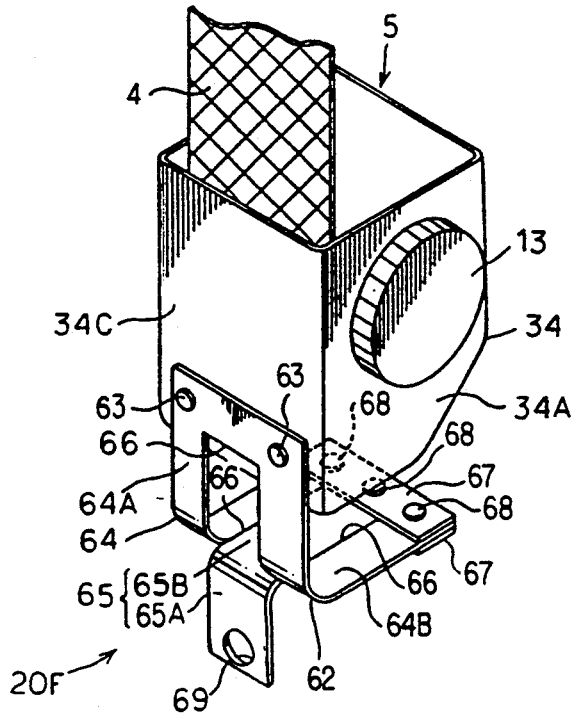
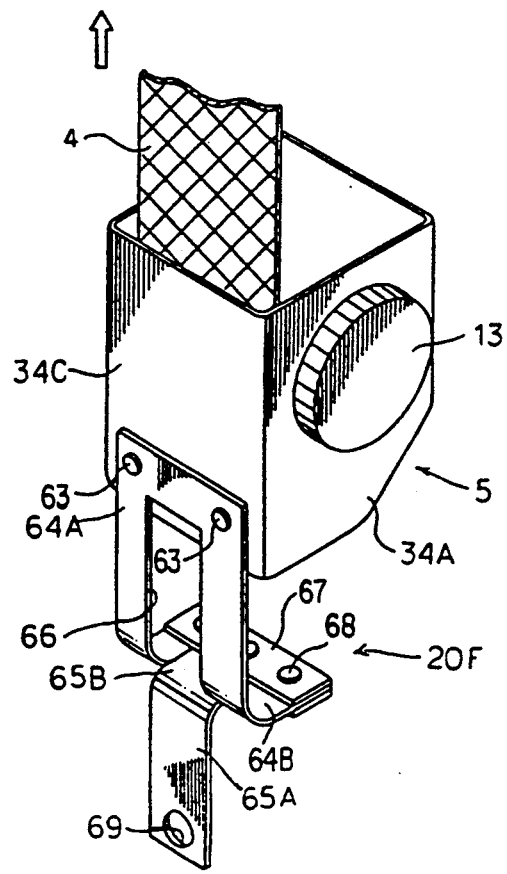
FIG. 9A  FIG. 9B

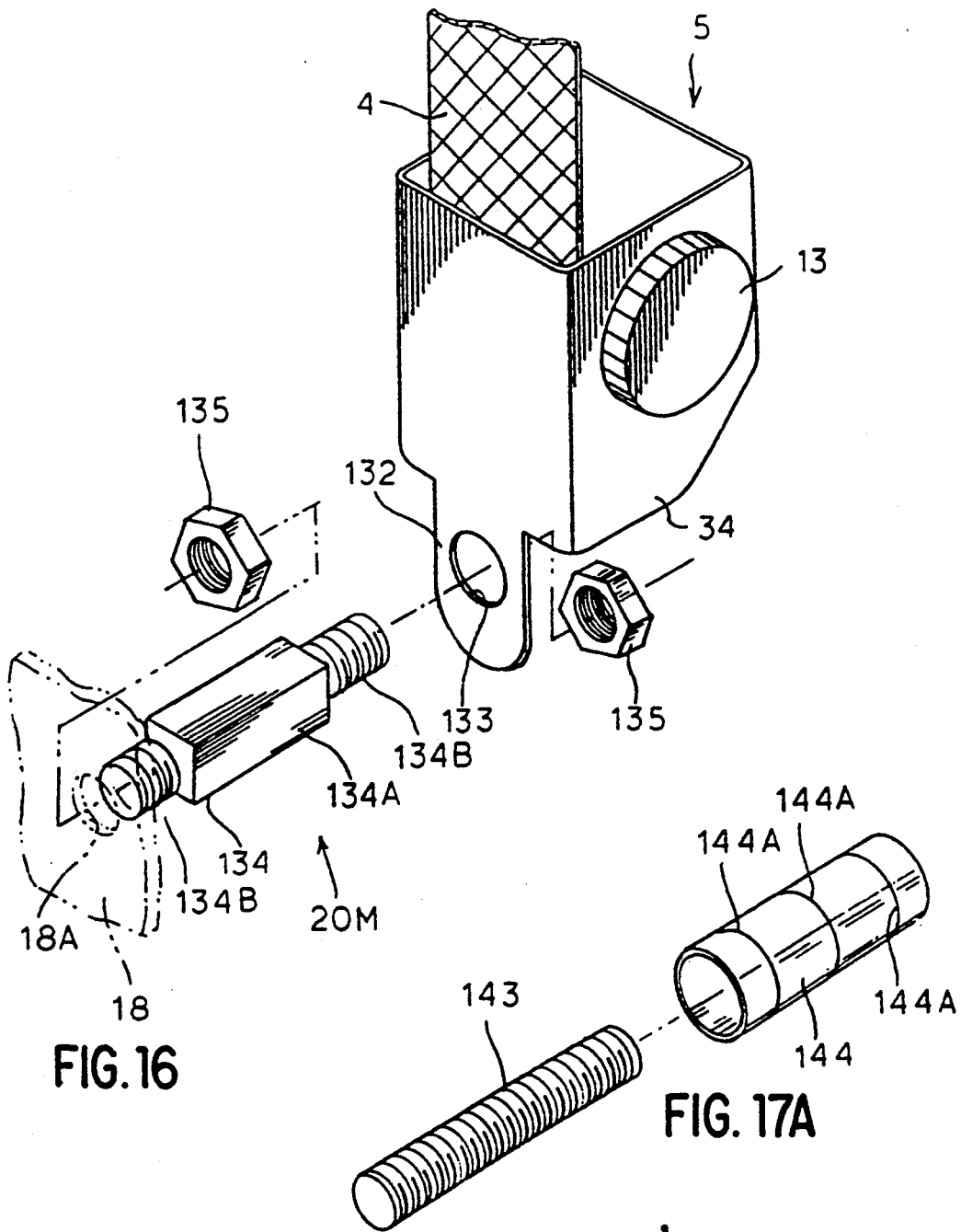
FIG. 16
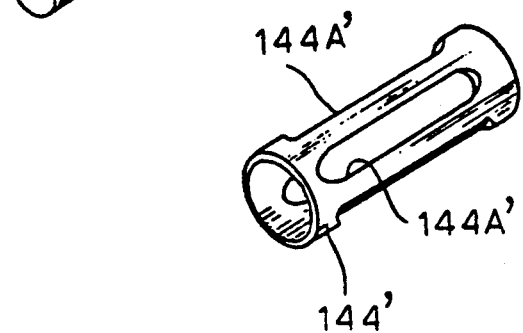
FIG. 17A
FIG. 17B

SAFETY APPARATUS INCLUDING AN AIR BAG AND A SAFETY BELT SUPPORTED ON A VEHICLE WITH A DEFORMABLE COUPLING

This is a Continuation of application Ser. No. 07/536,885, filed Jun. 13, 1990, now abandoned.

BACKGROUND OF THE INVENTION

1. Field of the Invention

The present invention relates to a driver safety apparatus for a vehicle, and, more particularly, to a safety belt apparatus for a vehicle provided with an air bag system for protecting the driver of the vehicle against injury in case of collision.

2. Description of Related Art

In recent years, a driver safety apparatus, including a safety air bag device, in addition to a safety belt device, has been installed in a vehicle to protect the driver of the vehicle against injury during a collision. An air bag of the air bag safety device is housed, when empty, in a container provided in, for instance, the steering wheel or the instrument panel of the vehicle. The air bag is quickly inflated by compressed gas on the occurrence of a collision. The safety air bag and safety belt can serve in combination to prevent the driver from being thrown out of the driver's seat during a straight-on, front end collision. Such a safety apparatus is known from Japanese Unexamined Patent Publication No. 62(1987)-139740.

During the use of the combination of safety belt device and safety air bag device, the driver is likely to be subjected to an abrupt, high pressure impact on his or her breast during a collision. This is because upon the occurrence of a collision, the air bag needs time before it is completely inflated and acts on the driver's breast as the driver plunges out of the seat toward the steering wheel. The time required for the air bag to inflate is slightly longer than the time in which the safety belt device acts quickly on the driver's breast. This results in doubled, abrupt applications of impact forces against the driver's breast. From the viewpoint of restraining or holding down the driver in the driver's seat, it is desirable that the safety device should not exert any abrupt, considerably high pressure impact on the driver.

SUMMARY OF THE INVENTION

A safety apparatus according to the present invention is installed in an automotive vehicle provided with an air bag system, an air bag of which is housed, when empty, in a container in front of a driver's seat of the vehicle and is inflated so as to protect the driver in the seat during a collision of the vehicle. The safety apparatus comprises a safety belt system having at least a shoulder belt engaged with a retractor for preventing the driver from being forwardly thrown out of the seat and for holding the driver's body on the seat during a collision of the vehicle. The safety belt system is provided with impact diminishing means for restraining or preventing the shoulder belt from being increasingly tensioned by the driver's body. The impact diminishing means may directly or indirectly cooperate with the shoulder belt.

The impact diminishing means is brought into action at a time before the inflated air bag acts on the driver's body with a maximum impact. The time is desirably set at a lapse of approximately 80% of a time period from when the air bag begins to act on the driver's body to when it acts on the same with the maximum impact.

BRIEF DESCRIPTION OF THE DRAWINGS

The above and other objects and features of the present invention will be apparent to those skilled in the art from the following description of preferred embodiments when considered in conjunction with the appended drawings, in which similar reference numbers have been used to designate the same or similar elements throughout the drawings and wherein:

FIG. 4A is a side view of impact diminishing means, before an action, or impact, of the safety apparatus in accordance with another preferred embodiment of the present invention;

FIG. 4B is a side view of impact diminishing means, after an action, or impact, of the safety apparatus of FIG. 4A;

FIG. 5A is a perspective view of impact diminishing means, before an action, or impact, of the safety apparatus in accordance with still another preferred embodiment of the present invention, wherein impact diminishing means is installed in a retractor frame;

FIG. 5B is a perspective view of impact diminishing means, after an action, or impact, of the safety apparatus of FIG. 5A;

FIG. 6A is a perspective view of impact diminishing means, before an action, or impact, of the safety apparatus in accordance with still another preferred embodiment of the present invention wherein impact diminishing means is installed on a retractor frame;

FIG. 6B is a perspective view of impact diminishing means, after an action, or impact, of the safety apparatus of FIG. 6A;

FIG. 7A is a perspective view of impact diminishing means, before an action, or impact, of the safety apparatus in accordance with yet another preferred embodiment of the present invention, wherein impact diminishing means is installed on a retractor frame;

FIG. 7B is a perspective view of impact diminishing means, after an action, or impact, of the safety apparatus of FIG. 7A;

FIG. 8A is a perspective view of impact diminishing means, before an action, or impact, of the safety apparatus in accordance with a further preferred embodiment of the present invention wherein impact diminishing means is installed between a retractor and part of a body;

FIG. 8B is a perspective view of impact diminishing means, after an action, or impact, of the safety apparatus of FIG. 8A;

FIG. 9A is a perspective view of impact diminishing means, before an action, or impact, of the safety apparatus in accordance with a still further preferred embodiment of the present invention, wherein impact diminishing means is installed between a retractor and part of a body;

FIG. 9B is a perspective view of impact diminishing means, after an action, or impact, of the safety apparatus of FIG. 9A;

FIG. 16 is a perspective view of impact diminishing means, before an action, or impact, of the safety apparatus in accordance with another preferred embodiment of the present invention, wherein impact diminishing means is formed as a stud installed between a retractor and part of a body;

FIG. 17A is an exploded perspective illustration showing, in part, impact diminishing means including a spacer; and FIG. 17B is a perspective illustration of a variant of the spacer of the impact diminishing means of FIG. 17A.

DESCRIPTION OF THE PREFERRED EMBODIMENTS

Figure 1:
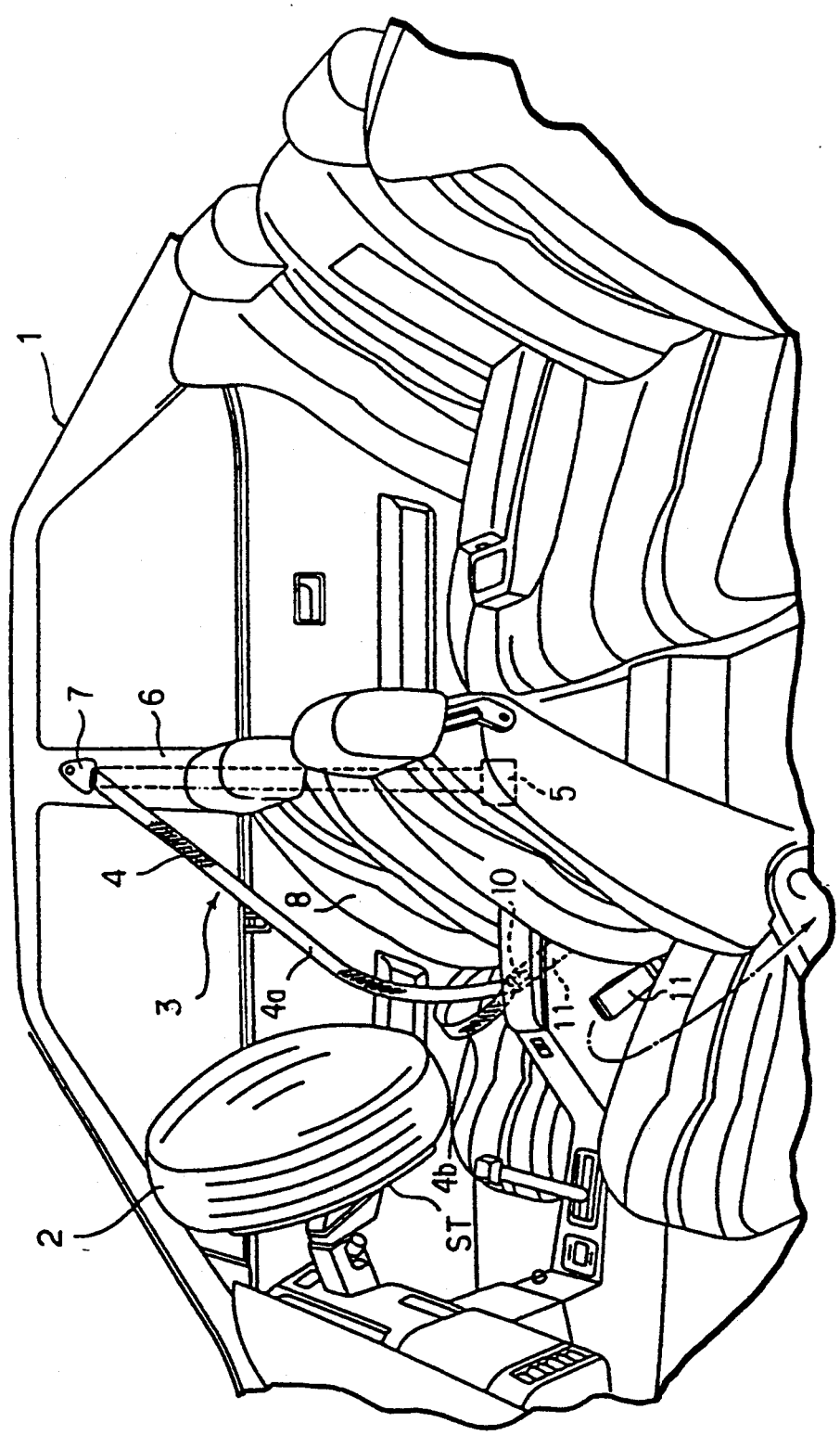
FIG. 1 is a schematic illustration partly showing an interior of a vehicle provided with a safety apparatus in accordance with a preferred embodiment of the present invention.

Referring to the drawings in detail, in particular to FIG. 1, an automotive vehicle having a driver safety belt apparatus in accordance with a preferred embodiment of the present invention is shown. The vehicle 1 is provided with a safety air bag device 2, an air bag of which is housed, when empty, i.e., when not filled with gas, in a boss of a steering wheel ST and, in addition, a driver safety belt apparatus (which will hereinafter be referred to simply as "the safety belt apparatus") 3. The safety belt apparatus is of a three point type and basically comprises a safety belt 4 and a retractor 5. The safety belt 4 is located over a driver's seat 8 with its ends connected to the retractor 5, disposed below a center pillar 6, and a part of a car body of the vehicle 1 which is close to the driver's seat 8.

Figure 2A:
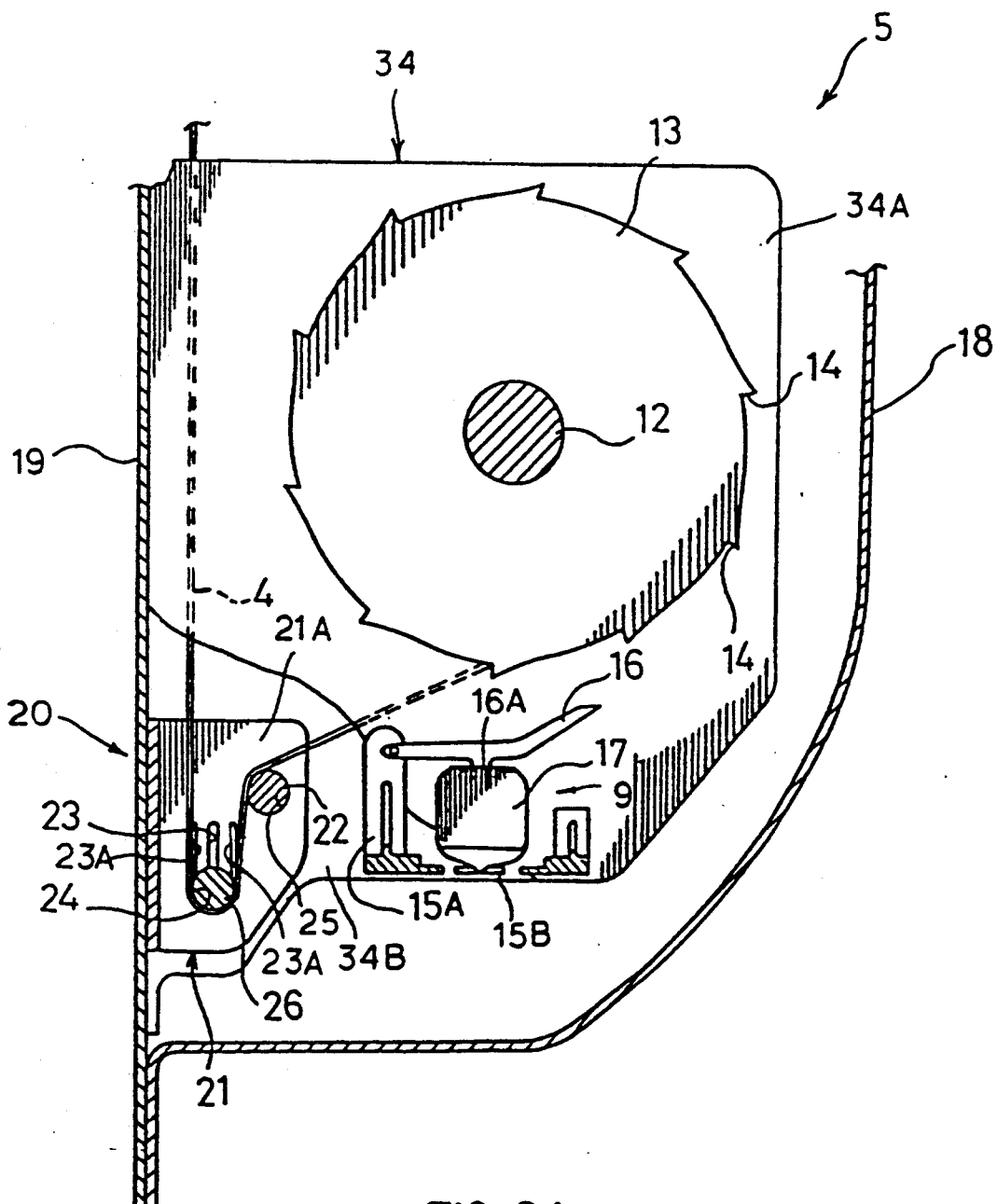
FIG. 2A is a cross-sectional view of the safety apparatus of FIG. 1.

The safety belt 4 has a locking clip attached to a tongue plate 10. This locking clip, as is well known in the art, is slidably mounted on the safety belt 4 so as to adjustably divide the safety belt 4 into a shoulder belt section 4a and a lap belt section 4b. Referring now to FIG. 2A, the safety belt 4 is, at its one end, fixed to and wound around a spring-loaded retractor shaft 12 supported by a retractor frame 34 of the retractor 5. The shoulder belt section 4a is hung so as to extend down by a hanger hook 7 swingably attached to an upper portion of the center pillar 6 so that it extends partly in a space formed in the hollow center pillar 6 and partly in front of the driver's seat 8. To fasten the safety belt 4, after adjusting shoulder belt section 4a to a desired length by pulling the locking clip of the tongue plate 10, the tongue plate 10 is inserted into an open end of a buckle 11 until an audible click is heard, indicating the safety belt 4 is locked.

Referring to FIG. 2A, showing the retractor 5 in detail, the retractor frame 34 is secured to a backing plate 19. A side sill inner plate 18, located below the center pillar 6, is secured to the backing plate 19 to form a space therebetween for the retractor 5. The spring-loaded retractor shaft 12 is rotatably mounted on the retractor frame 34 between side walls 34A and 34B with its one end projecting outside one side wall 34A of the retractor frame 34. A ratchet wheel 13, with teeth 14 arranged at a regular spacing on the periphery or circumference thereof, is coaxially and fixedly mounted on the projected end of the retractor shaft 12.

Ratchet means, generally indicated by 9 in FIG. 2A and mounted on the outer surface of the side wall 34A of the retractor frame 34, comprises a pawl 16 and a cylindrical weight 17. The pawl 16 is disposed facing the ratchet wheel 13 and is swingably supported by a supporting bracket or stud 15A of the ratchet means 9. The weight 17 is seated on and supported by a seat 15B, formed by a plate having a circular opening, for leaning movement in all directions. The weight 17 is formed with a conical recess on its top which slidably receives the lowermost end of an arm 16A of the pawl 16. The cylindrical weight 17 has a bottom configured so as to be convex so that it is forced to lean in a direction opposite to any direction of a substantially horizontal impact against the car body. The ratchet means 9 allows the cylindrical weight 17 to quickly react to an impact against the car body during, for instance, a collision and lean in a direction opposite to the direction of impact. When the cylindrical weight 17 leans, it acts as a cam and pushes up arm 16A of the pawl 16 in contact with the conical recess in the counterclockwise direction as viewed in FIG. 2A, thereby bringing the pawl 16 into engagement with one of the teeth 14 of the ratchet wheel 13 so as to prevent the ratchet wheel 13 from being further turned by tension applied to the safety belt 4. Such ratchet means is known in the art and is described, for instance, in U.S. Pat. No. 4,817,754.

Figure 2B:
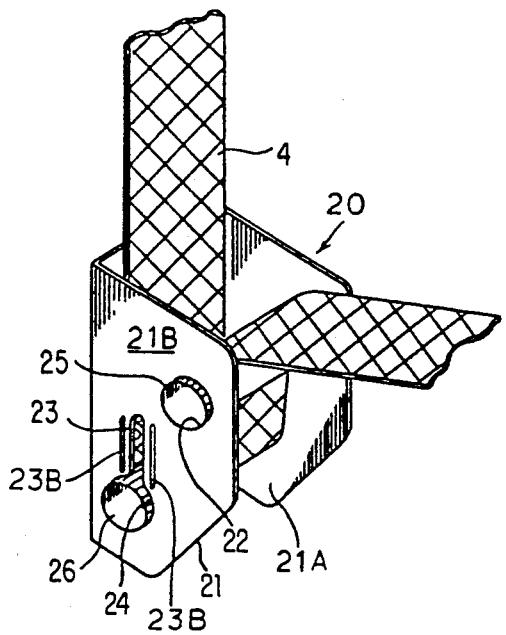
FIG. 2B is a perspective view of impact diminishing means, before an action, or impact, of the safety apparatus.
Figure 2C:
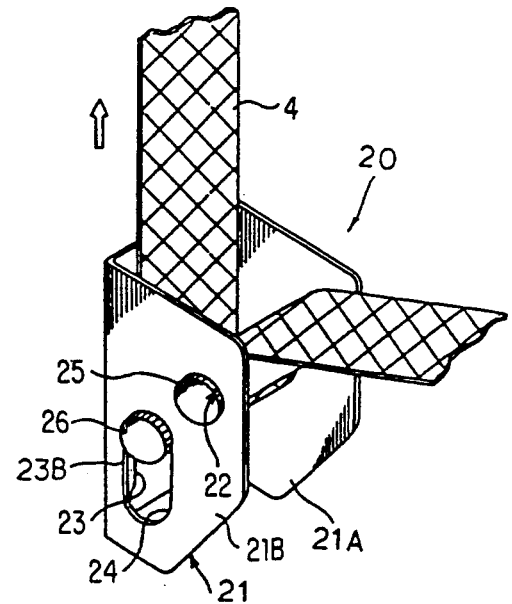
FIG. 2C is a perspective view of the impact diminishing means, after an action, or impact, of the safety apparatus.

The safety belt 4, in particular its shoulder belt section 4a, is engaged with impact diminishing means 20 incorporated in a bracket 21. As is shown in detail in FIGS. 2A to 2C, this bracket 21, generally shaped in the form of a channel, is disposed vertically with its opening facing the ratchet means 9, and is secured to a backing plate 19 to which the side sill inner plate 18, positioned below the center pillar 6, is secured to form a space therebetween for the retractor 5. The bracket 21 is formed with circular holes 22 in upper sections of both side walls 21A and 21B thereof, respectively, for rotatably supporting a cylindrical shaft 25. The bracket 21 is also formed with circular holes 24 in lower sections of the side walls 21A and 21B, respectively, for supporting a cylindrical shaft 26. Each hole 24 in the lower section of the side wall 21A, 21B of the bracket 21 is formed with a vertical slot 23 extending upwardly directly from the circular hole 24. The safety belt 4, in particular its shoulder belt section 4a, is slidably threaded in a S-like fashion between the shafts 22 and 26. It should be noted that the bracket 21 is adapted and designed to allow part of each side wall 21A, 21B surrounding the slot 23 to be bent inside by the shaft 26 when the shaft 26 is forced vertically upwardly by a specific tensioning force of the safety belt 4. It is desirable to form a thin slit 23A on each side of the slot 23 in the side wall 21A, 21B in order for the part of the side wall 21A, 21B surrounding the slot 23 to be easily bent with reliability.

When a straight-on, front end collision of the vehicle 1 occurs, the driver is quickly plunged out of the seat 8 toward the steering wheel ST, withdrawing the safety belt 4 from the retractor 5, and turning the ratchet wheel 13 in the clockwise direction as viewed in FIG. 2A. Simultaneously with the occurrence of collision, the cylindrical weight 14 is forced to lean backwardly, thereby swinging up the pawl 16 so as to bring the end of the pawl into engagement with an appropriate one of the teeth 14 of the turning ratchet wheel 13. As a result, the ratchet wheel 13 is prevented from turning further, thereby restricting the safety belt 4 from being withdrawn to tension the safety belt 4. If the force applied by the body of the driver to the safety belt 4 exceeds a specific tensioning force, the shaft 26 is forced vertically upwardly by the safety belt 4 while simultaneously bending, at least partly, the side walls 34A and 34B.

Such an upward movement of the shaft 26 absorbs partially and diminishes an external force exerted on the safety belt 4 by the body of the driver during the straight-on, front end collision of the vehicle. Thereby, the safety belt 4 is prevented from having an increase in tension which exceeds the specific tensioning force as to prevent the driver's body from being given an excessively high pressure impact, as a reaction, from the safety belt 4.

At the same time the safety belt apparatus is brought into action, the air bag safety device is actuated to inflate the air bag 2 by compressed gas so as to retain the body of the driver from plunging or being thrown from the driver's seat 8. Since the inflation of air bag 2 is rapid, but not instantaneous, the time at which a pressure impact is applied to the driver's body by the inflated air bag 2 is behind, i.e., after the time at which an impact is applied to the driver's body by the safety belt 4.

Figure 3:
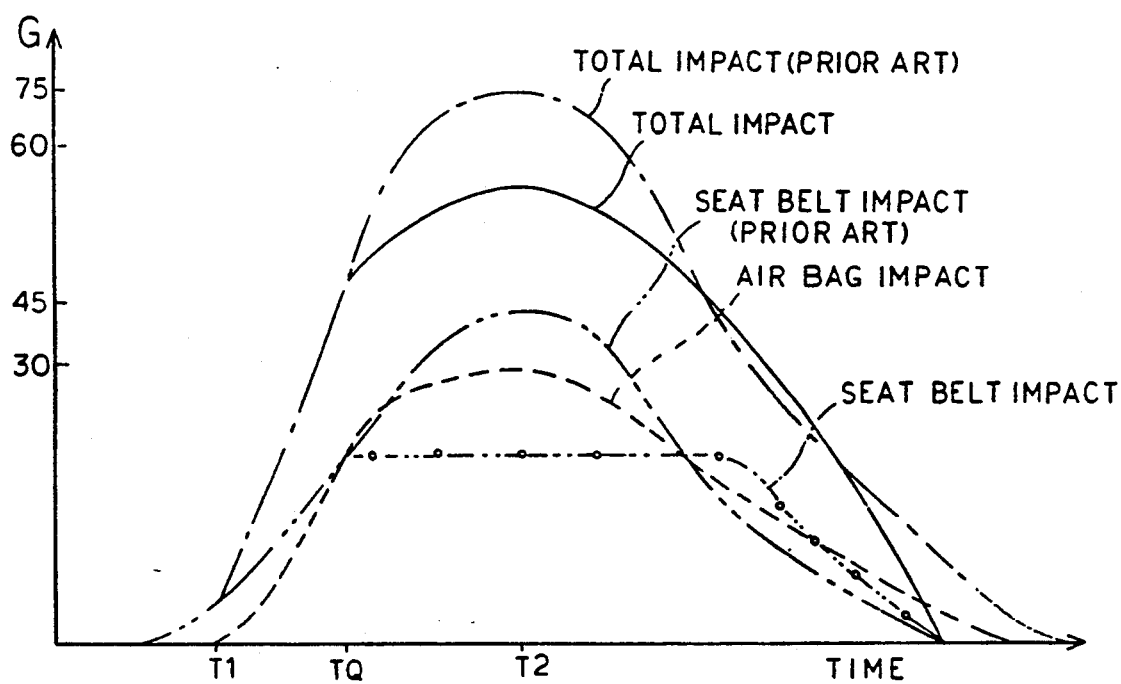
FIG. 3 is a force diagram showing the result of using the safety apparatus of FIG. 1.

The example shown in FIG. 3 provides basic guidance in designing the shock diminishing means 20. It should be noted first that for satisfying a driver's safety requirements, the driver safety apparatus should not exert, on the driver's body, more than about 60 G of pressure impact, which would damage seriously the driver's heart. Safety belt devices and air bag safety systems are generally estimated to apply a maximum pressure impact, on a driver's body, of approximately 45 G and 30 G, respectively.

Considering, as an example, the occurrence of a front end collision against a solid retaining wall at a speed of about 56 KPH (34.8 MPH), the retractor 5 begins to retain the safety belt 4 at a timing T1, about 20 msecs., after the moment of collision and, therefore, the shoulder belt section 4a is gradually tensioned by the driver's body as it is thrown from the seat 8. The air bag 2 begins to inflate immediately after the collision. After the completion of inflation of the air bag 2, it exerts on the driver's body a maximum pressure impact, which is estimated to be about 30 G, at a timing T2, about 40 to 50 msecs., after the moment of collision. The impact diminishing means 20 begins its impact diminishing action before the air bag 2 exerts, on the driver's body, the maximum pressure impact of about 30 G.

At a timing TQ, which is desirably 80% of the time T2, or about 32 to 40 msecs., after the action of retractor 5, the impact diminishing means 20 begins its action. Upon a collision at a speed of about 56 KPH (34.8 MPH), a pressure impact applied to the driver's body by the safety belt 4, in particular the shoulder belt section 4a, is estimated to be approximately 25 G.

According to the above analytical studies, the impact diminishing means 20 is designed to be brought into action when the safety belt 4 is tensioned with a specific force equivalent to the pressure impact of approximately 25 G. Such a pressure impact occurs at the timing TQ. The impact diminishing means 20 thus designed begins its action and starts to damp, or dissipate, the force applied by the shoulder belt 4 to the body of the driver, at the timing TQ.

Impact diminishing means does not always have to be restricted so as to be located closely to the retractor. As long as it is directly engaged with the safety belt, the impact diminishing means may be located remotely from the retractor.

FIGS. 4A and 4B show an alternative impact diminishing means at 20A located in a space between outer and inner center pillar panels 6A and 6B of the hollow center pillar 6. The impact diminishing means 20A includes a bracket 27, shaped in the form of a channel, secured to the outer center pillar panel 6A with its opening facing the inner center pillar panel 6B. The bracket 27 is formed with circular holes 28 in upper sections of both of its side walls 27A for rotatably supporting a cylindrical shaft 31. The bracket 21 is also formed with circular holes 30 in lower sections of both of its side walls 27A for supporting a cylindrical shaft 32. Each circular hole 30 in the lower section of the side wall 27A of the bracket 27 is formed with a straight slot 29 extending directly upwardly therefrom. The safety belt 4, and in particular its shoulder belt section 4a, is slidably threaded in S-like fashion between the shafts 31 and 32. To allow part of each side wall 27A surrounding the slot 29 to be bent inwardly by the shaft 32 when the shaft 32 is forcibly pulled upwardly by a vertical force exceeding the specific tensioning force, the bracket 27 is desirably formed with a slit 29A on each side of the slot 29 in the side walls 27A.

Impact diminishing means cooperating with the safety belt apparatus of the present invention may take various forms which may be engaged not only directly but also indirectly with the safety belt. The impact diminishing means may also be installed on or in the retractor. Various structures according to another preferred embodiment of the present invention are shown in FIGS. 5A through 7B as having an impact diminishing means installed in the retractor. It is to be noted that throughout the following embodiments, although the same ratcheting means as are installed in the safety belt apparatus of the previous embodiment are also provided in the retractors of these embodiments, the ratcheting means have been omitted in these figures for the purpose of clarity.

Referring now to FIGS. 5A and 5B, impact diminishing means according to another preferred embodiment of the present invention is shown at 20B as being installed in the retractor 5. The retractor frame 34 is formed with circular holes 43 in both of its walls 34A and 34B in their lower sections for supporting a cylindrical shaft 44. Each hole 43 in the wall 34A, 34B of the retractor frame 34 is formed with a vertical slot 42 extending upwardly directly therefrom. The safety belt 4, in particular its shoulder belt section 4a, is slidably threaded in a U-like fashion around the shaft 43. The retractor frame 34 is adapted to allow part of the side walls 34A, 34B surrounding the slot 42 to be bent inside the retractor frame 34 by the shaft 43 when the shaft 43 is forced vertically upwardly by a vertical force of the safety belt 4 in excess of the specific tensioning force. For enabling the part of the wall 21A, 21B surrounding the slot 23 to bend easily and with reliability, a slit 42B is desirably formed on each side of the slot 42 in the side wall 34A, 34B. A hole shown at 48 is used to secure the retractor frame 34 to the backing plate 19 (see FIG. 2A) by, for instance, a fastening bolt.

Referring now to FIGS. 6A and 6B, alternative impact diminishing means is shown at 20C as installed in the retractor frame 34. The retractor frame 34 supports fixedly a cylindrical shaft 40 between both side walls 34A and 34B at their middle sections and is formed with an elongated, vertically extending hole 39 in each side wall 34A, 34B at its lower sections. In these vertically extending holes 39, a cylindrical shaft 35 is slidably received. Both ends of each shaft 35, 40 project outside the side walls 34A and 34B of the retractor frame 34. Rear springs 36 (one of which is hidden in FIGS. 6A and 6B), elastically bent in a generally U-like fashion, are provided between and have ringed ends 37 and 38 which engage with the projected ends of the shafts 35 and 40 so as to press down the shaft 35 against the bottom of the vertically extending holes 39, thereby keeping the shafts 35 and 40 as far apart as possible. The vertically extending holes 39 allow the shaft 35 to move upwardly when the rear springs 36 are compressed.

The safety belt 4, and in particular its shoulder belt section 4a, is slidably threaded in a U-like fashion around the shaft 35. The impact diminishing means 20C, accordingly, allows the shaft 35 to slide upwardly in the vertical holes 39 when the safety belt 4 is subjected to a vertical force in excess of the specific tensioning force.

Referring to FIGS. 7A and 7B, another alternate construction of impact diminishing means is shown at 20D as installed on or in the retractor frame 34. The retractor frame 34 is provided with elongated vertically extending holes 52 in lower half sections of the both side walls 34A and 34B of the retractor frame 34. In these vertically extending holes 52, a cylindrical shaft 53 is slidably received. Both ends of the shaft 53 project laterally outside the side wall 34A and 34B of the retractor frame 34. The retractor frame 34 is integrally formed with a hook 54 extending downwardly from each lower edge therefrom. Tension springs 55 (one of which is hidden in FIGS. 7A and 7B) are provided between the ends of the shaft 53 and the hooks 54 at their ringed ends so as urge the shaft 53 down against the bottom of the vertically extending holes 52. The vertically extending holes 52 allow the shaft 53 to move upwardly when forced upwardly by tension applied to safety belt 4 which overcomes the tension force applied by springs 55 on the shaft 53.

The safety belt 4, and in particular its shoulder belt section 4a, is slidably threaded in a U-like fashion around the shaft 53. The impact diminishing means 20D, accordingly, allows the shaft 53 to slide up in the vertical holes 52 when the safety belt 4 is subjected to a vertical force in excess of the specific tensioning force.

Impact diminishing means cooperating with the safety belt apparatus of the present invention may also be designed to cooperate with the retractor and not to be directly engaged with the safety belt. Various structures according to further preferred embodiments of the present invention are shown in FIGS. 8A through 17 as having impact diminishing means directly cooperating with the retractor. It is also to be noted that although the same ratchet means as is installed in the safety belt apparatus of the previous embodiments are also provided in the retractors of these embodiments, it has been omitted in these figures for the purpose of clear illustration.

Referring now to FIGS. 8A and 8B, the retractor 5 is disposed in a space formed between the side sill inner plate 18 and a backing plate 19. The retractor 5 is coupled to the side sill inner plate 18 by impact diminishing means 20E secured to both the retractor frame 34 and side sill inner plate 18.

The impact diminishing means 20E comprises a generally U-shaped, deformable arm 56, which may be made of an elastically deformable metal, with its top ends secured to the back wall 34C of the retractor frame 34 and a bracket 57 bolted to the side sill inner plate 18. The U-shaped arm 56 is deformed and extended when the retractor 5 is pulled up by the safety belt 4.

To define and limit the vertical movement of the retractor frame 34, the side sill inner plate 18 is provided with upper and lower stopper shoulders 18A and 18B and an appropriate number of guide ribs 58 all of which may be formed either integrally with or separately from the side sill inner plate 18.

Since the U-shaped arm 56 is deformable, the shock diminishing means 20E allows the retractor frame 34 to slide upwardly between the stopper shoulders 18A and 18B in the space when the safety belt 4 is subjected to a vertical force in excess of a specific tension.

Referring to FIGS. 9A and 9B, the retractor 5, disposed in the space formed between the side sill inner plate and backing plate (see FIG. 2), is coupled to the side sill inner plate by shock diminishing means 20F secured or bolted to the retractor frame 34 and side sill inner plate 18.

The shock diminishing means 20F comprises a generally L-shaped deformable bracket 62 with a tongue-like piece 65A made of an elastically deformable metal. To form the bracket 62, a flat, rectangular sheet member, such as an elastically deformable metal sheet, is scored or stamped with score or stamp lines 66, which define an elongated inside section 65 surrounded by an integral, substantially U-shaped outside section 64. The elongated inside section 65 is partially ripped along lines 66 and bent, for instance, downwards to form a tongue-like piece 65A. Portion 64A of the U-shaped outside section 64 is bent in the opposite direction relative to the vertical tongue-like piece 65A, for instance upwardly. These bent portions 64A and 65A are bent so that they are even with each other, i.e., portions 64A and 65A are disposed in the same vertical plane. The remaining horizontal portion 65B of the elongated inside section 65 is left intact with horizontal portions 64B of outside section 64. Ends of the elongated inside section 65 and U-shaped outside section 64 are sandwiched by transverse members 67 and fixed to the transverse members by rivets or caulking pins 68. Thus, the elongated inside section 65 is formed into an L-shaped fashion. Either before or after scoring or stamping the lines 66, the elongated inside portion 65 is formed with a hole 69.

The deformable bracket 62 is, on one hand, secured to the back wall 34C of the retractor frame 34 at its bottom portion by rivets or caulking pins 63 and, on the other hand, to the backing plate 19 (see FIG. 2) by, for example, a bolt (not shown) through the hole 69.

The score lines 66 surrounding portion 65B of the L-shaped elongated inside section 65 of the shock diminishing means 20F allow the elongated inside section 65 to be ripped away, along the lines 66, from the horizontal portion 64B of the U-shaped outside section 64 and deformed so as to be straight, as illustrated in FIG. 9B. The shock diminishing means 20F thus allows the retractor frame 34 to slide upwardly, being ripped and stretched substantially vertically when the safety belt 4 is subjected to a vertical force in excess of a specific tension.

Figure 10A:
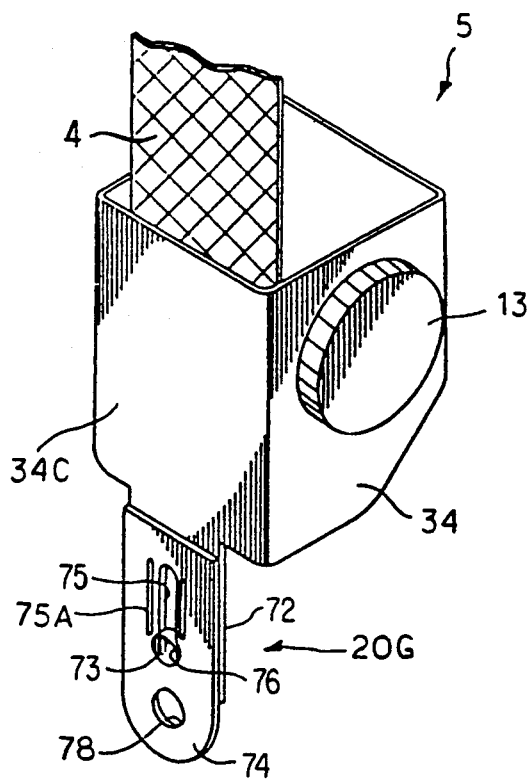
FIG. 10A is a perspective view of impact diminishing means, before an action, or impact, of the safety apparatus in accordance with a yet further preferred embodiment of the present invention, wherein impact diminishing means is installed between a retractor and part of a body.
Figure 10B:
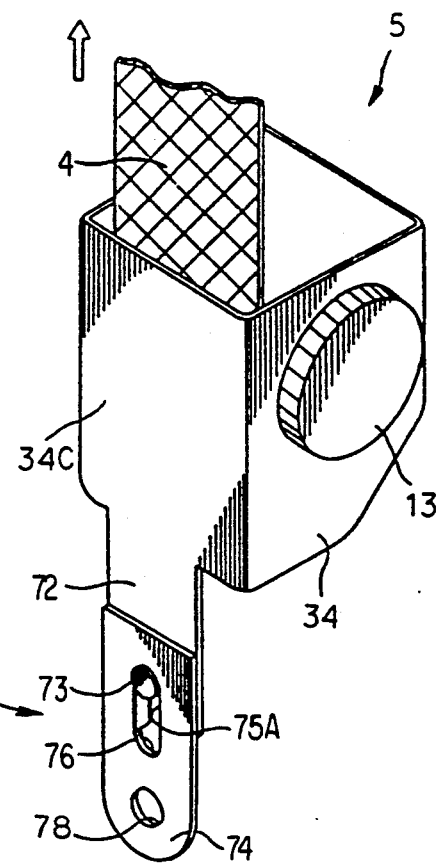
FIG. 10B is a perspective view of impact diminishing means, after an action, or impact, of the safety apparatus of FIG. 10A.

Referring to FIGS. 10A and 10B, the retractor 5, disposed in the space formed between the side sill inner plate and backing plate (see FIG. 2), is coupled to the side sill inner plate by shock diminishing means 20G secured or bolted to the side sill inner plate.

The shock diminishing means 20G comprises a flat, tongue-like coupling member 74 formed with a hole 76 and a vertical slot 75 extending upwardly directly from the circular hole 76.

The retractor frame 34 of the retractor 5 is provided with a tongue-like frame extension 72 extending downwardly from the back wall 34C and having a connecting pin 73 secured thereto. The tongue-like coupling member 74 is overlapped with the tongue-like frame 72 of the retractor frame 34 and coupled to the same by receiving the connecting pin 73 in the circular hole 76. It is to be noted that coupling member 74 is adapted to be partly bent inside on both sides of the vertical slot 75 by the connecting pin 73 when the retractor frame 34 is forced vertically upwardly. For this purpose, it is desirable to form a slit 75A in the coupling member 74 on both sides of the slot 23, to enable that portion of the coupling member adjacent the slot 75 to bend easily and with reliability. A hole shown at 78 is used to secure the retractor frame 34 to the backing plate 19 (see FIG. 2A) by, for instance, a bolt.

Since the coupling member 74 is deformable or bendable, the shock diminishing means 20G allows the coupling member 74 to be partly deformed along the slits 75A when the connecting pin 73 is forcibly pushed up. Accordingly, the retractor frame 34 is allowed to slide upwardly, partly deforming the retractor frame 34 when the safety belt 4 is subjected to a vertical force in excess of a specific tension.

Figure 10C:
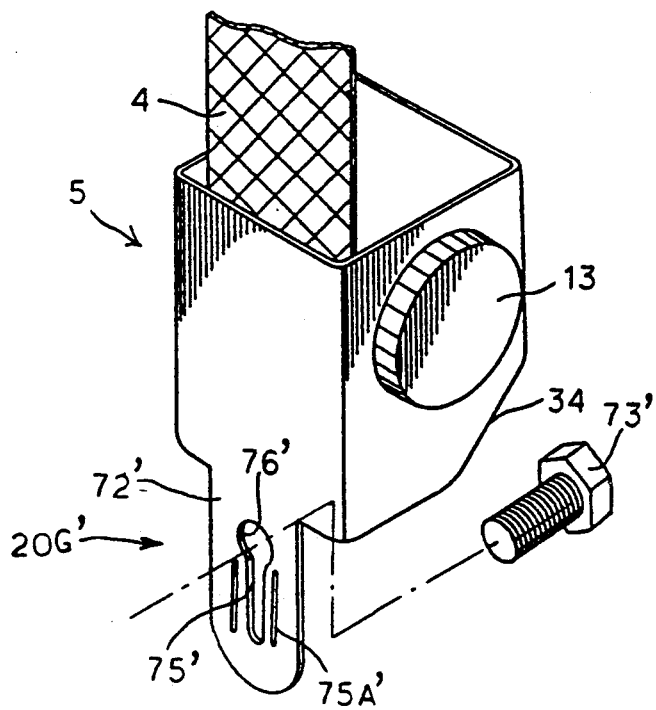
FIG. 10C is an exploded perspective view of an variant of the impact diminishing means of FIG. 10A.

The coupling member 74 may, if desired, be formed integrally with the tongue-like frame extension 72. That is, as is shown in FIG. 10C, the retractor frame 34 may be provided with a tongue-like frame extension 72' formed as a shock diminishing means 20G' which extends downwardly from its back wall 34C. The tongue-like frame extension 72' is formed with a hole 76' and a vertical slot 75' extending downwardly directly from the circular hole 76'. The tongue-like frame extension 72' of the retractor frame 34 is secured to the backing plate 19 (see FIG. 2A) by a fastening bolt 73' which is passed through the circular hole 76'. The frame extension 72' is adapted to be partly bent inside, on both sides of the vertical slot 75', by the fastening bolt 73' when the retractor frame 34 is forced vertically upwardly. It is also desirable to form a slit 75A' in the extension frame 72' on both sides of the slot 75' for easy and reliable bending of that portion of the frame extension 72 adjacent the vertical slot 75'.

Figure 11A:
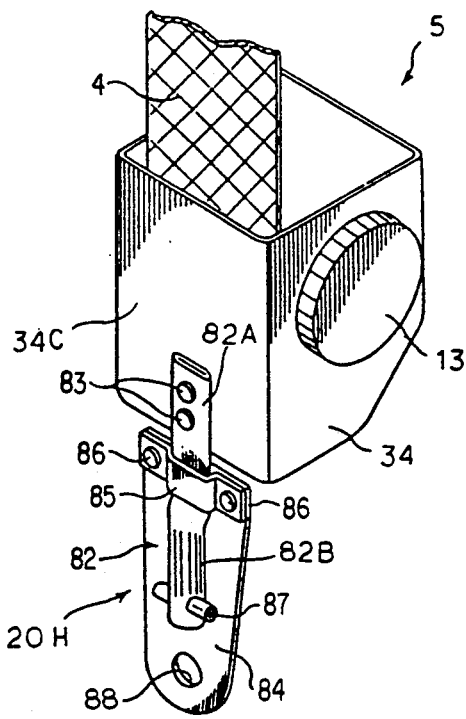
FIG. 11A is a perspective view of impact diminishing means, before an action, or impact, of the safety apparatus in accordance with a further preferred embodiment of the present invention, wherein impact diminishing means is installed between a retractor and part of a body.
Figure 11B:
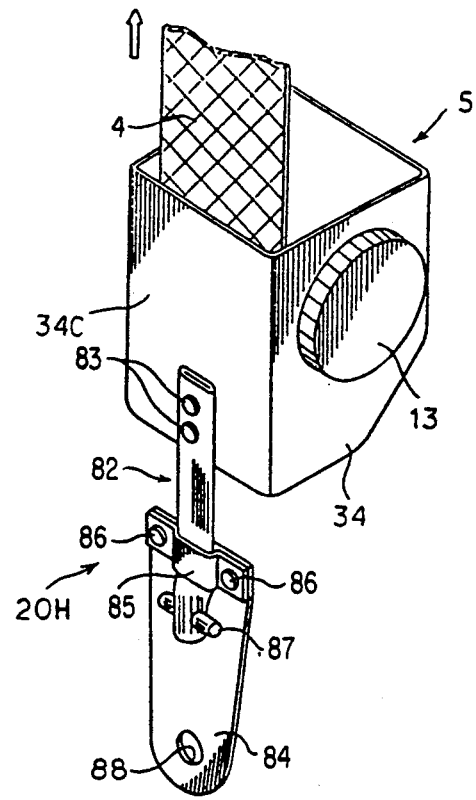
FIG. 11B is a perspective view of impact diminishing means, after an action, or impact, of the safety apparatus of FIG. 11A.

Referring to FIGS. 11A and 11B, the retractor 5, disposed in the space formed between the side sill inner plate and backing plate (see FIG. 2), is coupled to the side sill inner plate by shock diminishing means 20H secured or bolted to the side sill inner plate.

Shock diminishing means 20H comprises a coupling pipe 82 with an upper half portion 82A which has been crushed flat and a lower half portion 82B, capable of being crushed but not having been crushed. The coupling pipe 82 has a stopper pin 87 near its lower end, and, as will become clear, a bracket 84 is mounted on the coupling pipe. The coupling pipe 82 is secured to the backwall 34C of the retractor frame 34 by caulking pins 83. The bracket 84 is provided with a holding member 85 secured thereto by caulking pins 86. The holding member 85 holds a transitional portion between the upper crashed portion 82A and lower pipe portion 82B. Bracket 84 is formed with a hole 88 near its lower end for securing the bracket to the side sill inner plate (see FIG. 2) by a bolt (not shown).

Since the coupling member 82 is deformable or capable of being crushed, the shock diminishing means 20H allows the coupling member 82 to be squeezed and crushed by the holding member 85 when the retractor frame 34 is forcibly drawn up. Accordingly, the retractor frame 34 is allowed be pulled and slide upwardly until the holding member 85 abuts the stopper pin 87, deforming or crushing lower pipe portion 82B of the coupling pipe 82 flat as the retractor frame 34 is forcibly moved up. Thus, the shock diminishing means 20H allows the retractor 5 to move upwardly when the safety belt 4 is subjected to a vertical force in excess of a specific tension, i.e., a tension sufficient to cause lower pipe portion 82B to yield and be crushed by holding member 85.

Figure 12A:
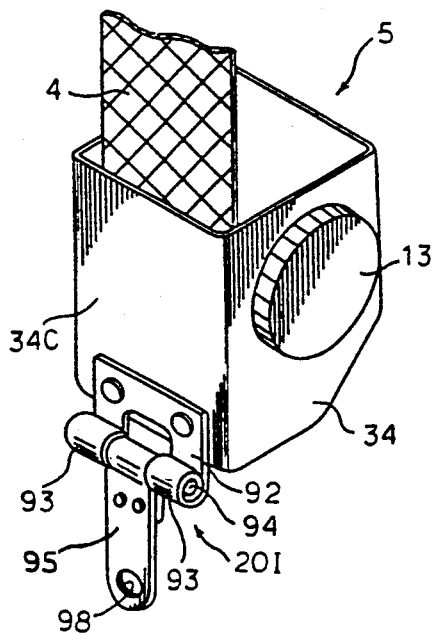
FIG. 12A is a perspective view of impact diminishing means, before an action, or impact, of the safety apparatus in accordance with another preferred embodiment of the present invention, wherein impact diminishing means is installed between a retractor and part of a body.
Figure 12B:
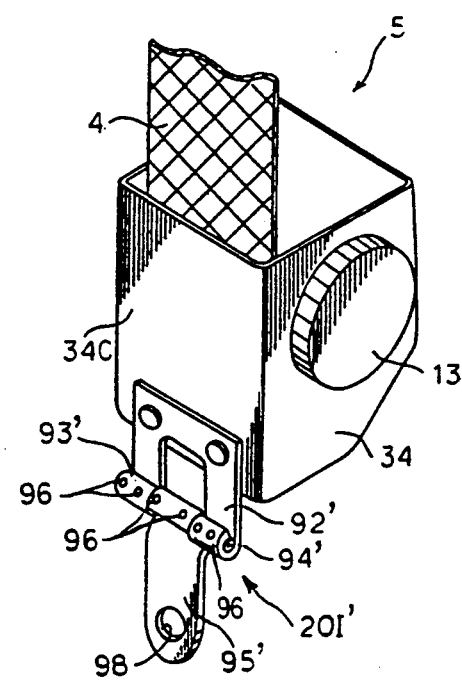
FIG. 12B is an exploded perspective view of an variant of the impact diminishing means of FIG. 12A.

Referring to FIGS. 12A and 12B, the retractor 5, disposed in the space formed between the side sill inner plate and the backing plate (see FIG. 2), is coupled to the side sill inner plate by shock diminishing means 20I secured or bolted to the side sill inner plate.

Shock diminishing means 20I is of a type of hinge comprising a deformable hinge member 92 and a rigid bracket 95. The bracket 95 is formed at its lower end portion with a hole 98 used to secure the retractor frame 34 to the backing plate 19 (see FIG. 2A) by, for instance, a bolt, and is provided with a shaft 94 fixedly held thereby and having ends projecting outside from each side of the bracket 95. The hinge member 92, made of an elastically deformable metal sheet or plate generally having a U-shaped form, is secured to the back wall 34C of the retractor frame 34 by, for instance, caulking pins. Each leg portion 93 of the hinge member 92 is coiled around one of the projecting ends of the shaft 94.

Since the hinge member 92 is elastically deformable, the shock diminishing means 20I allows the wound leg portions 93 of the hinge member 92 to be deformed or stretched straight by the shaft 94 when the retractor frame is forcibly pulled up. Accordingly, the retractor frame 34 is allowed to slide upwardly, deforming or stretching the wound leg portions 93 of the hinge member 92 straight when the safety belt 4 is subjected to a vertical force in excess of a specific tension.

Referring to FIG. 12B, there is shown a modified hinge type of impact diminishing means by which the retractor disposed in the space formed between the side sill inner plate and backing plate (see FIG. 2) is coupled to the side sill inner plate.

Impact diminishing means 20I' comprises a rigid U-like hinge member 92' and a rigid bracket 95' coupled to the U-like hinge member 92' by an elastic coupling rod or shaft 94'. The hinge member 92' is secured to the back wall 34C of the retractor frame 34 by, for instance, caulking pins. Each leg portion 93' of the hinge member 92' is coiled around the elastic shaft 94' by less than a single turn in one direction, for example in the counterclockwise direction as viewed in FIG. 12B, and secured near its end to the elastic shaft 94' by caulking pins 96. The top portion of the rigid bracket 95' is also coiled around the elastic shaft 94' by less than a single turn in the other direction, for example in the clockwise direction, and secured near its end to the elastic shaft 94' by caulking pins 96. These caulking pins 96 are arranged in an axial line. The coupling rod 94' has such a diameter and an elasticity as to be twisted when receiving torsional moment in circumferential opposite directions by the rigid hinge member 92' and bracket 95'.

Since the elastic rod 94' is elastically deformable or twistable, the shock diminishing means 20I' allows the coupling rod 94' to be deformed or twisted when it receives torsional moment in circumferentially opposite directions. Accordingly, the shock diminishing means 20I' absorbs or diminishes a vertical force in excess of the specific tensioning force applied to the retractor frame 34 by the safety belt 4.

Figure 13:
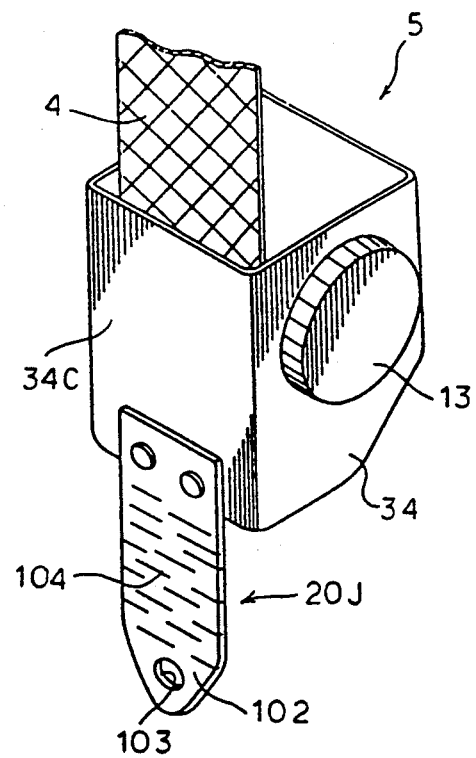
FIG. 13 is a perspective view of impact diminishing means, before an action, or impact, of the safety apparatus in accordance with another preferred embodiment of the present invention, wherein impact diminishing means is installed between a retractor and part of a body.

Referring to FIG. 13, the retractor 5 is coupled to the side sill inner plate by shock diminishing means 20J secured or bolted to the side shill inner plate.

Shock diminishing means 20J comprises a bracket 102 secured to the back wall 34C of the retractor frame 34 (see FIG. 2A) by, for instance, caulking pins or rivets, and secured to a side sill inner plate by a bolt passed through a hole 103 formed near the lower end the bracket 102. The bracket 102 is formed with a number of transverse score lines 104 which are transversely discontinuous. Each scoring line 104 is cut through the full thickness of the bracket 102. It is to be noted that more than half of the scoring lines 104 extend from side edges of the bracket 102.

When forcibly pulled up in its lengthwise direction, the bracket 102 is deformed and extended in the same direction, i.e., lengthwise. Therefore, the shock diminishing means 20J allows the retractor frame 34 to slide upwardly, while deforming and extending the bracket 102, when the safety belt 4 is subjected to a vertical force in excess of a specific tension.

Figure 14:
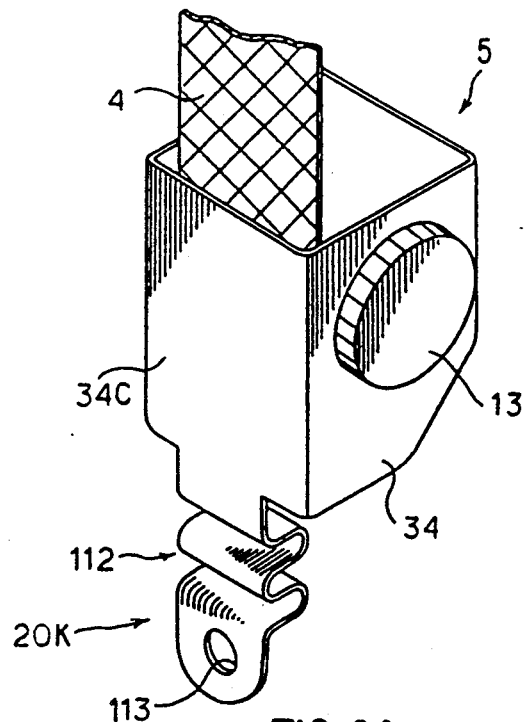
FIG. 14 is a perspective view of impact diminishing means, before an action, or impact, of the safety apparatus in accordance with yet another preferred embodiment of the present invention, wherein impact diminishing means is installed between a retractor and part of a body.

Referring to FIG. 14, the retractor 5 is coupled to the side sill inner plate by shock diminishing means 20K secured or bolted to the side sill inner plate.

Shock diminishing means 20K comprises a bracket 112 integrally formed with or otherwise secured to the back wall 34C of the retractor frame 34 and attached to a side sill inner plate (see FIG. 2A) by, for instance, a bolt passed through a hole 113 formed near the lower end the bracket 112. The bracket 112 is formed so as to have an undulated, or W-like configuration. This bracket 112 may be made either integrally with or separately from the retractor frame 34.

When it is forcibly pulled up in its lengthwise direction, the bracket 112 is deformed and stretched into its full length. Therefore, the shock diminishing means 20K allows the retractor frame 34 to slide upwardly, deforming and stretching the bracket 112, when the safety belt 4 is subjected to a vertical force in excess of a specific tension, i.e., a vertical force sufficient to cause the W-like bracket to yield and straighten.

Figure 15:
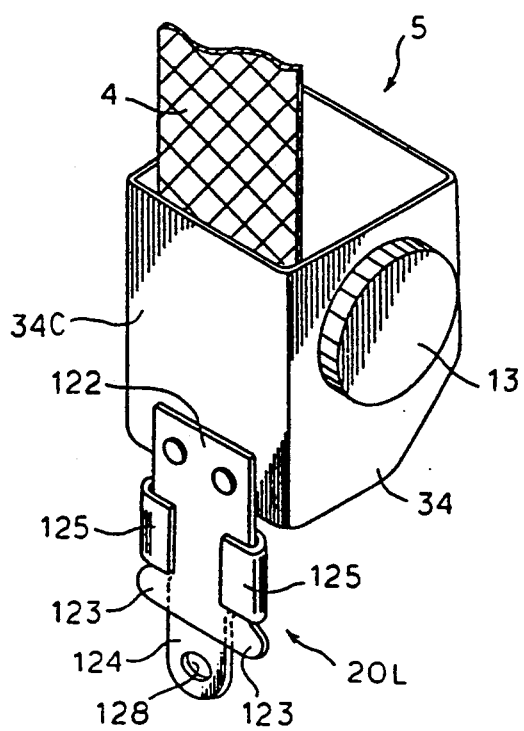
FIG. 15 is a perspective view of impact diminishing means, before an action, or impact, of the safety apparatus in accordance with still another preferred embodiment of the present invention wherein impact diminishing means is installed between a retractor and part of a body.

Referring to FIG. 15, the retractor 5, disposed in the space formed between the side sill inner plate and backing plate (see FIG. 2), is coupled to the side sill inner plate by shock diminishing means 20L secured or bolted to the side sill inner plate.

Shock diminishing means 20L comprises a coupling member 122 and a bracket 124. The coupling member 122 is integrally formed at its lower end with lateral projections or laterally projecting tabs 123 and is bolted or caulked at its top end to the back wall 34A of the retractor frame 34. The bracket 124 is formed with a hole 128 near its lower end for securing itself to the side sill inner plate (see FIG. 2) by a bolt (not shown). The bracket 124 is integrally provided with holding clips 125, each formed as a clip to firmly but slidably hold side margins of the coupling member 122 between the laterally projecting tabs 123 and the bottom of the retractor frame 34. The laterally projecting tabs 123 of the coupling member 122 is designed to be destroyed by the holding clips 125 when the retractor frame 34 is forcibly moved up with a vertical force larger than a specific force, i.e., a force sufficient to break off or otherwise destroy laterally projecting tabs 123.

Since the coupling member 122 is capable of being destroyed, the shock diminishing means 20L allows the retractor frame 34 to slide upwardly when the safety belt 4 is subjected to a vertical force in excess of the specific tension equal to or greater than the force sufficient to destroy tabs 123.

Shock diminishing means cooperating with the safety belt apparatus of the present invention may also be provided in combination with a retractor frame fasting bolt as shown in FIG. 16.

Referring to FIG. 16, the retractor 5, disposed in the space formed between the side sill inner plate and backing plate (see FIG. 2), is secured to the side sill inner plate by a stud.

The retractor frame 34 of the retractor 5 has an bottom frame extension 132 formed with a hole 133. A double-end stud 134, including shock diminishing means 20M, has a center shank portion 134A having a substantially square cross-section and opposite threaded end boss portions 134B, each extending from one end of the center shank portion 134A. The retractor frame 34 of the retractor 5 is located at the desired distance from the side sill inner plate 18 with the shank portion 134A disposed between the bottom frame extension 132 of the retractor frame 34 of the retractor 5 and the side sill inner plate 18. The threaded ends 134b of the stud 134 are plugged into the hole 133 of the retractor frame extension 132 and a hole 18A of the side sill inner plate 18. The retractor frame 34 is then fixed firmly by nuts 135 screwed onto the threaded boss portions of the double-end stud 134 to side sill inner plate 18.

The double-end stud 134 is designed so that the center shank portion 134A has a certain length sufficient to locate the retractor 5 at a desired distance from the side sill inner plate 18 and is capable of bending when it receives a force, larger than a specific force, perpendicular to its longitudinal axis and at its end.

In place of the double-end stud 134 shown in FIG. 16, a combination of threaded-rod and spacer is usable to constitute shock diminishing means. That is, as is shown in FIG. 17A, a threaded rod 143 and a sleeve or cylindrical spacer 144 are provided in place of the double-end stud of the shock diminishing means 20M of FIG. 16. The cylindrical spacer 144, which is loosely fitted on the threaded rod 143, has a full length sufficient to locate the retractor 5 at a desired distance from the side sill inner plate 18. The threaded rod 143 and cylindrical spacer 144 are adapted to bend as one unit when receiving a force larger than a specific force perpendicular to the longitudinal axis and at one end of the threaded rod. For easy bending, the cylindrical spacer 144 is formed with several score lines 144A on its outer periphery.

The retractor frame 34 of the retractor 5 is located at the desired distance from the side sill inner plate 18 with the cylindrical spacer 144 loosely fitted on the threaded rod 143 disposed between the bottom frame extension 132 of the retractor frame 35 of the retractor 5 and the side sill inner plate 18. Then, the retractor frame 34 is fixed firmly by nuts 135 screwed onto the opposite ends of the threaded rod 142.

For easier bending, the cylindrical spacer 144 may be replaced with a sleeve or cylindrical spacer 144' formed with several axially extending slots 144A' as shown in FIG. 17B.

It is to be understood that although the invention has been described in detail with respect to preferred embodiments, various other embodiments and variants are possible which are within the spirit and scope of the invention, and such embodiments and variants are intended to be covered by the following claims.

What is claimed is:

1. A safety apparatus for an automotive vehicle, comprising:

an air bag system including an air bag which is housed, when empty, in a container in front of a seat of the vehicle and inflatable to protect an occupant of said seat during a collision of said vehicle;

a safety belt system having at least a shoulder belt engaged with a retractor for preventing forward plunging of said occupant of said seat to hold said occupant in said seat during the collision of said vehicle; and impact diminishing means associated with said safety belt system for restraining said shoulder belt and preventing said shoulder belt from applying a pressure impact above a particular value to said occupant before said air bag acts on said occupant with a maximum pressure impact, the impact diminishing means thereby limiting a total impact applied to the occupant during the collision by said air bag and said shoulder belt; and stopper means for preventing excessive upward movement of said retractor once said shoulder belt is subjected to a vertical force exceeding a specific tension.

2. A safety apparatus as defined in claim 1, wherein an impact applied to the occupant by said shoulder belt is maximized before said air bag acts on said occupant with said maximum impact.

3. A safety apparatus as defined in claim 2, wherein said impact diminishing means is associated with said retractor.

4. A safety apparatus as defined in claim 3, wherein said impact diminishing means comprises coupling means for coupling said retractor to part of a body of said vehicle, said coupling means being capable of deforming so as to allow said retractor to move when said shoulder belt is subjected to a vertical force exceeding said specific tension, thereby preventing said shoulder belt from being increasingly tensioned.

5. A safety apparatus as defined in claim 4, wherein said coupling means comprises a deformable U-shaped bracket with a pair of arms, one arm secured to said retractor and the other arm secured to said part of said body.

6. A safety apparatus as defined in claim 4, wherein said coupling means comprises a deformable L-shaped bracket secured to said retractor and a deformable tab secured to said part of said body, said tab being partly integrated into said deformable L-shaped bracket and being able to be ripped away from said bracket when said shoulder belt is subjected to said vertical force exceeding said specific tension.

7. A safety apparatus as defined in claim 1, wherein said impact diminishing means is associated with said retractor.

8. A safety apparatus as defined in claim 7, wherein said impact diminishing means comprises coupling means for coupling said retractor to part of a body of said vehicle, said coupling means being capable of deforming so as to allow said retractor to move when said shoulder belt is subjected to a vertical force exceeding said specific tension, thereby preventing said shoulder belt from being increasingly tensioned.

9. A safety apparatus as defined in claim 8, wherein said coupling means comprises a deformable U-shaped bracket with a pair of arms, one arm secured to said retractor and the other arm secured to said part of said body.

10. A safety apparatus as defined in claim 8, wherein said coupling means comprises a deformable L-shaped bracket secured to said retractor and a deformable tab secured to said part of said body, said tab being partly integrated into said deformable L-shaped bracket and being able to be ripped away from said bracket when said shoulder belt is subjected to said vertical force exceeding said specific tension.

11. A safety apparatus as defined in claim 8, wherein said coupling means comprises an elastically deformable member directly secured between said retractor and said part of said body.

12. A safety apparatus as defined in claim 11, wherein said elastically deformable member is adapted to be stretched when said shoulder belt is subjected to said vertical force exceeding said specific tension.

13. A safety apparatus as defined in claim 12, wherein said elastically deformable member is formed with a number of transverse score lines, each being transversely discontinuous so as to allow said elastically deformable member to be stretched when said shoulder belt is subjected to said vertical force exceeding said specific tension.

14. A safety apparatus as defined in claim 12, wherein said elastically deformable member is folded so as to be stretched when said shoulder belt is subjected to said vertical force exceeding said specific tension.

15. A safety apparatus as defined in claim 13, wherein said elastically deformable member is a stud bendable when said shoulder belt is subjected to said vertical force exceeding said specific tension.

16. A safety apparatus as defined in claim 15, wherein said stud has a center shank portion having a length for spacing apart said retractor from said part of said body at a desired distance and threaded end boss portions extending from both ends of said center shank portion.

17. A safety apparatus as defined in claim 15, wherein said stud comprises a fastening bolt and a cylindrical spacer fitted on said fastening bolt, said cylindrical spacer having a length for spacing apart said retractor a desired distance from said part of said body.

18. A safety apparatus as defined in claim 17, wherein said cylindrical spacer is formed with a plurality of circumferential score lines.

19. A safety apparatus as defined in claim 18, wherein said cylindrical spacer is formed with a plurality of axial slots.

20. A safety apparatus as defined in claim 7, wherein said impact diminishing means comprises coupling means for coupling said retractor to part of a body of said vehicle, said coupling means being capable of torsionally deforming so as to absorb an external force applied to said retractor when said shoulder belt is drawn with a specified tension load, thereby preventing said shoulder belt from being increasingly tensioned.

21. A safety apparatus as defined in claim 20, wherein said coupling means comprises two brackets, said brackets separately secured at respective first ends to said part of said body and said retractor and at respective second ends to a torsionally deformable rod, said two brackets being fixedly coupled by said second ends to said torsionally deformable rod.

22. A safety apparatus as defined in claim 21, wherein each of said two brackets is coiled at said second end around said torsionally deformable rod by less than a single turn.

23. A safety apparatus for an automotive vehicle, comprising:

an air bag system including an air bag which is housed, when empty, in a container in front of a seat of the vehicle and inflatable to protect an occupant of said seat during a collision of said vehicle;

a safety belt system having at least a shoulder belt engaged with a retractor for preventing forward plunging of said occupant of said seat to hold said occupant in said seat during the collision of said vehicle;

impact diminishing means associated with said retractor for restraining said shoulder belt and preventing said shoulder belt from being increasingly tensioned by said occupant at a time before said air bag is inflated and acts on said occupant with a maximum impact so as to decrease a total impact applied to the occupant during the collision by said air bag and said shoulder belt, said impact diminishing means comprising coupling means for coupling said retractor to part of a body of said vehicle, said coupling means being capable of deforming so as to allow said retractor to move when said shoulder belt is drawn with a specified tension load, thereby preventing said shoulder belt from being increasingly tensioned, said coupling means comprising a deformable U-shaped bracket with a pair of arms, one arm secured to said retractor and the other arm secured to said part of said body; and guide means for guiding upward movement of said retractor.

* * * * *